United States Patent Office 3,441,659
Patented Apr. 29, 1969

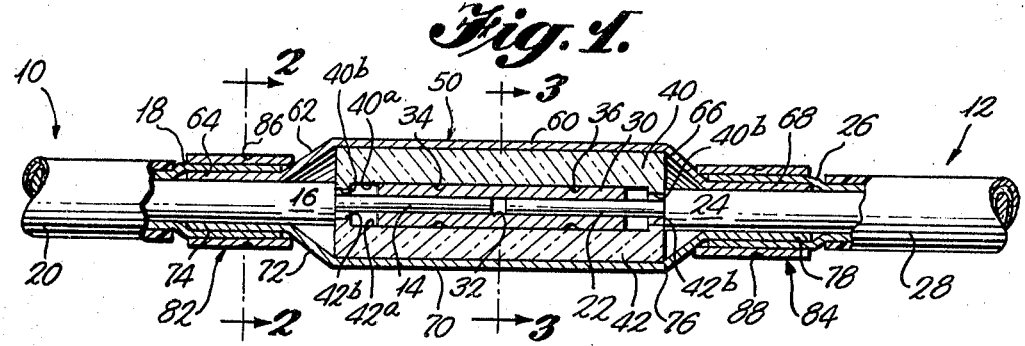
Fig. 1.
Fig. 2.
Fig. 3.
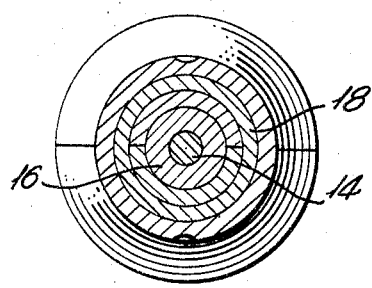
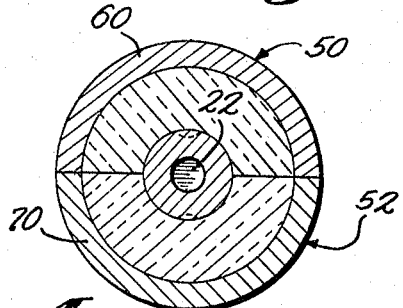
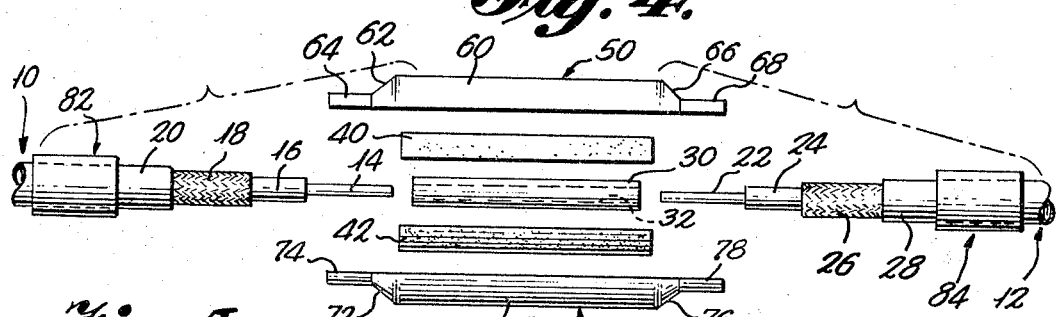
Fig. 4.
Fig. 5.
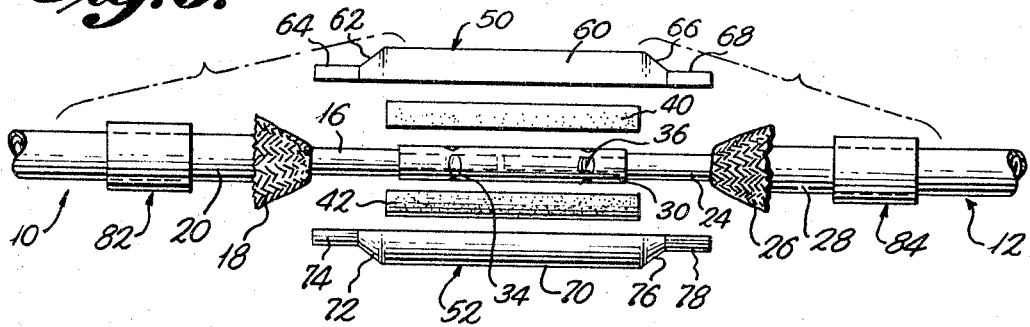

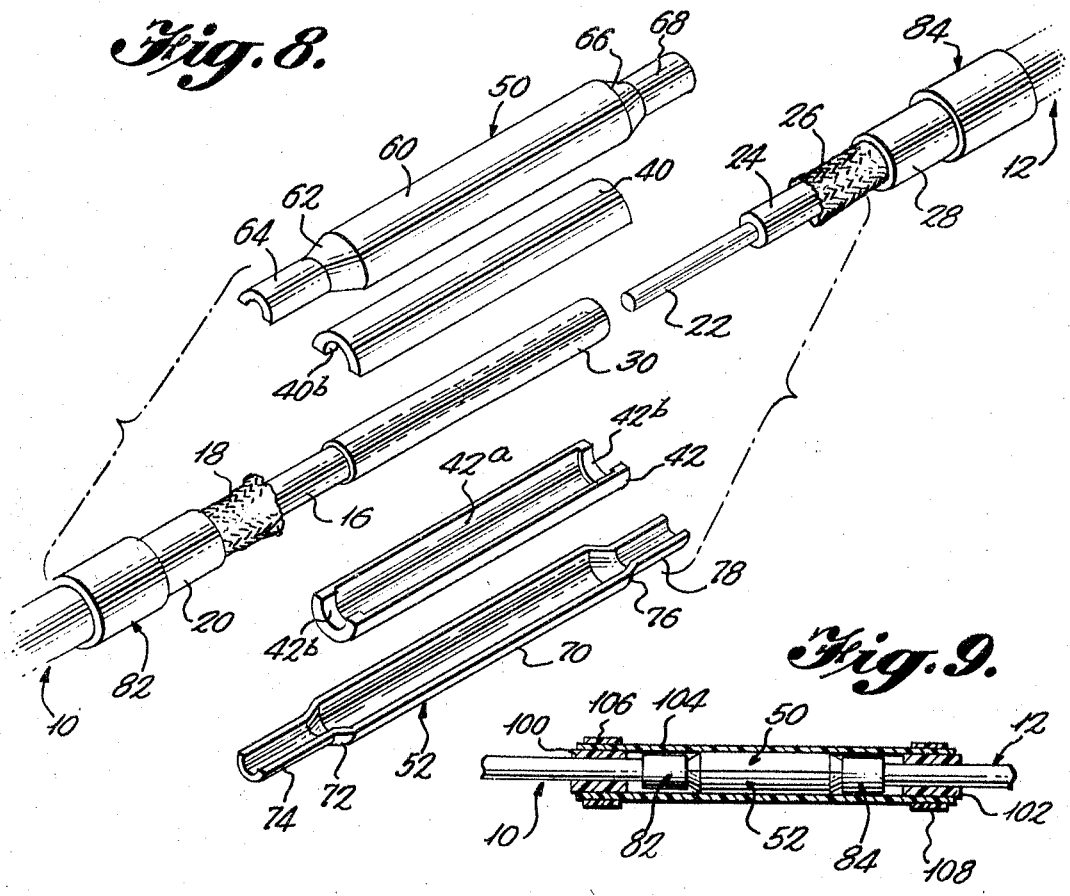

3,441,659
SHIELDED HEATER CABLE CONNECTION
Ronald Clair Laudig, Camp Hill, and Donald Lee Smith, Middletown, Pa., assignors to AMP Incorporated, Harrisburg, Pa.
Filed Feb. 13, 1967, Ser. No. 615,654
Int. Cl. H02g 15/18
U.S. Cl. 174—88                    2 Claims

ABSTRACT OF THE DISCLOSURE

A splice for a pair of heated cables whereby a ferrule is crimped to the central conductor, and a ceramic shell surrounds the crimped portion to provide an electrically-insulated heat sink to permit escape of the heat from the crimped section.

Background of the invention

The present invention relates to a cable connector, and more particularly to a permanent splice connection between the ends of a pair of braided or shielded heater cables.

The cable connector of the present invention is directed to an arrangement for permanently splicing together cables having central conductors surrounded by a layer of dielectric material which is, in turn, surrounded by a layer of metallic braid, this braid further being surrounded by the outer jacket of insulating material of the cable. Such a cable splice is shown, for example, in U.S. Patent No. 2,536,003.

The cable connector, as illustrated in the above-mentioned patent, is not suitable for use with heater cables wherein the conductors of the cable generate a considerable amount of heat because of the increased electrical resistance of the spliced section. When heater cables are spliced to one another, it is essential to provide a suitable means forming a heat sink so that excessive heat will pass outwardly through the connector assembly away from the spliced section. The arrangement, as shown in the aforementioned patent, obviously would not be suitable since no heat sink means whatsoever is provided.

When a further means in the form of a heat sink means is provided, assembly of the cable connector presents a very difficult problem, and it will be noted that with an arrangement as shown in the aforementioned patent, various components of the connector must be assembled over the associated cables and then slid into operative relationship with respect to one another. It is apparent that if a plurality of members are to be provided and to rest within one another, it would not be feasible to assemble the components in the manner as shown in this patent.

Additionally, prior art cable connectors as shown in the aforementioned patent do not provide a weatherproof seal with respect to the associated cables, and accordingly the completed assembly cannot be employed in locations wherein the device would be exposed to the elements.

Summary of the invention

The cable connector of the present invention incorporates a heat sink means disposed in surrounding relationship to the contact means connecting the bared ends of the two cables. This heat sink means completely surrounds the bared ends of the cables and the associated contact means, and furthermore the opposite ends of the heat sink means engage the ends of the layers of dielectric material disposed in surrounding relationship to the conductors of the two cables so that the electrically-conductive components, including the conductors and the contact means, are completely protected so that the amount of heat escapes from the connector to protect the spliced sections.

The heat sink means, as well as the shell means disposed in surrounding relationship to the heat sink means, are both formed of two parts which are substantially similar and complementary to one another so that both the heat sink means and the shell means can be readily assembled in operative relationship with respect to one another.

The opposite ends of the shell means are of reduced dimension and are received under the braid of the two cables, whreupon annular ferrules are crimped around the braid to thereby effectively clamp the entire connector assembly in operative position and to provide a very strong completed splice.

In a modified form of the invention, a weatherproof sleeve is disposed in surrounding relationship to the aforementioned components and is clamped about a pair of bushings disposed in sealing relationship about each of the cables. Accordingly, a completely weatherproof structure is provided in this form of the invention.

An object of the present invention is to provide a new and novel cable connector incorporating heat sink means for reducing the amount of heat passing through the splice; wherein the components of the connector assembly may be readily assembled; and further, wherein a substantially weatherproof arrangement may be provided.

Brief description of the drawings

FIGURE 1 is a cross sectional view through a cable connector assembly according to the present invention;

FIGURE 2 is a sectional view on an enlarged scale taken substantially along line 2—2 of FIGURE 1, looking in the direction of the arrows;

FIGURE 3 is a sectional view on an enlarged scale taken substantially along line 3—3 of FIGURE 1, looking in the direction of the arrows;

FIGURE 4 is an exploded view illustrating the various components of the cable connector of the present invention prior to assembly on the ends of a pair of cables;

FIGURE 5 is a view similar to FIGURE 4, illustrating certain initial steps in assembling the cable connector;

FIGURE 6 is a view illustrating further steps in the assembly of the cable connector;

FIGURE 7 illustrates the completed connector assembly;

FIGURE 8 is an exploded, perspective view illustrating the components of the cable connector assembly; and FIGURE 9 is a sectional view through a modified form of the invention.

Description of the preferred embodiments

Referring now to the drawings wherein like reference characters designate corresponding parts throughout the several views, a first form of the invention is illustrated in FIGURES 1–8, inclusive. As seen most clearly in FIGURE 4, a pair of braided or shielded heater cables are indicated generally by reference numerals 10 and 12, it being desired to splice the ends of these cables to one another. Cable 10 includes a central conductor 14 which may, in a typical example, comprise nichrome wire or the like. Conductor 14 is surrounded by a layer of dielectric material 16 which, for example, may comprise Teflon or other suitable plastic material. Layer 16 is, in turn, surrounded by a layer of conventional metallic braid 18 which is further surrounded by the jacket 20 of the cable which is formed of suitable insulating material and may also comprise Teflon. The various portions of the cable are stripped back, as indicated in FIGURE 4, to permit proper assembly of the cable connector as will hereinafter be fully described.

Cable 12 is of the same construction as cable 14 and includes a central conductor 22 surrounded by a layer 24 of dielectric material which is further surrounded by a metallic braid 26. The insulating jacket 28 is, in turn, disposed in surrounding relationship to braid 26. It will be noted that the end of cable 12 also has the components thereof stripped back relative to one another in the same manner as cable 10.

The cable connector includes a contact means 30 formed of a suitable electrically-conductive material, such as copper or the like, which is sufficiently flexible to be crimped about the bared conductors of the two cables. This contact means has a longitudinally-extending bore 32 formed therethrough which is adapted to receive the conductors 14 and 22 therewithin, these conductors being secured in operative position by crimping contact means 30 as indicated at 34 and 36.

The heat sink means of the connector comprises a pair of members 40 and 42 each of which forms substantially one-half of the complete sink means, members 40 and 42 being of substantially identical construction. These members of the heat sink means are formed of a suitable electrical-insulating material, such as a ceramic substance and the like.

Member 40 of the heat sink means has a substantially semicylindrical recess 40a defined thereby, and includes a pair of lips 40b at opposite ends thereof which define a semicircular hole at opposite ends of reduced dimension as compared with the recess thereof. In a similar manner, member 42 of the heat sink means includes a substantially semicylindrical recess 42a therewithin, and has a pair of lips 42b disposed at opposite ends thereof defining generally semicircular holes of reduced dimension as compared with the recess defined thereby.

As seen in FIGURES 1 and 3, the two halves 40 and 42 of the heat sink means are adapted to be assembled in abutting relationship with one another and in surrounding relation to the contact means 30. The contact means is relatively snugly received within the recess defined by the recesses 40a and 42a of members 40 and 42, respectively.

As seen especially in FIGURE 1, when the heat sink means is disposed in assembled relationship, the conductors 14 and 22 of the two cables extend through the holes defined by lips 40b and 42b at opposite ends of the heat shield means. These lips define holes of reduced dimension as compared with the recess which receives the contact means, and it will be noted that the opposite ends of the heat sink means are disposed in abutting relationship with the outer ends of the layers of dielectric material 16 and 24 of the two cables so that an effective heat sink is provided completely around the conductors.

A shell means comprises two members 50 and 52 each of which form substantially one-half of the shell means, members 50 and 52 being of substantially identical construction and being formed of a suitable relatively rigid material such as brass or the like.

Member 50 of the shell means includes an enlarged, generally-cylindrical central portion 60 which tapers inwardly along a portion 62 to one, reduced-end portion 64. The enlarged portion 60 similarly tapers along a portion 66 to a reduced-end portion 68.

Member 52 of the shell means includes an enlarged, generally-cylindrical central portion 70 which tapers along a portion 72 to a first, reduced-end portion 74. Central portion 70 similarly tapers along a portion 76 to an opposite reduced-end portion 78.

As seen most clearly in FIGURES 1 and 3, the shell means including members 50 and 52 are adapted to be disposed in abutting relationship with one another to form the complete shell means, the enlarged central portions 60 and 70 of the two shell members fitting relatively snugly about the members 40 and 42 of the heat sink means. It will be noted, particularly as seen in FIGURE 1, that the heat sink means is of greater longitudinal dimension than the contact means 30, while the shell means is, in turn, of greater longitudinal dimension than the heat sink means.

Clamping means is provided in the form of a pair of ferrules 82 and 84 of tubular construction which are adapted to fit about the insulating jackets of the two cables. These ferrules are formed of a suitable metallic substance which can be readily crimped so as to clamp the assembly in operative position and may, for example, be formed of brass or the like.

When it is desired to assemble the cable connector of the present invention on the ends of a pair of cables, the cables are first stripped and trimmed as indicated in FIGURE 4, and the clamping ferrules 82 and 84 are slid onto the insulating jackets of the two cables as illustrated.

The bared ends of the conductors 14 and 22 are then inserted within contact means 30, which is crimped at 34 and 36 as shown in FIGURE 5. The two members 40 and 42 of the heat sink means are then assembled about the contact means in engagement with one another.

The braid 18 and 26 of the two cables is then folded back as indicated in FIGURE 5, and the two members 50 and 52 of the shell means are then assembled in surrounding relationship to the heat sink means with the reduced-end portions of the two shell members fitting snugly about the dielectric portions 16 and 24 of the two cables.

The braid 18 and 26 is then folded back over the outer surface of the reduced-end portions of the shell members. The clamping ferrules 82 and 84 are then slid into their final position, as shown in FIGURE 1, in surrounding relationship to the braid 18 and 26. Ferrules 82 and 84 are then crimped in their final operative position as indicated at 86 and 88, respectively. It will be noticed that in the final assembled position of the ferrules, they are disposed in abutting relationship with the sloping portions of the associated shell members. It will, of course, be understood that a conventional crimping tool is employed for crimping the various members in operative relationship.

The completed cable connector, as spliced according to the present invention, is illustrated in FIGURE 1, and it will be noted that the plurality of elements is capable of being assembled in a relatively easy manner and that, when in the assembled relationship shown, an effective heat sink is provided, and a good mechanical and electrical interconnection is provided between the various components of the splice assembly.

Referring now to FIGURE 9 of the drawings, a modified form of the invention is illustrated. In this form of the invention, the cable connector arrangement, as shown in the previous figures, is also employed with cables 10 and 12. Additionally, a pair of bushings 100 and 102 are provided, these bushings being formed of a suitable weather-resistant material such as Teflon or the like, and having central bores formed therethrough which are adapted to be snugly received on the insulating jackets of the cables. The outer surfaces of bushings 100 and 102 are substantially cylindrical.

A sleeve 104 which may also be formed of Teflon or the like is provided, this sleeve being substantially cylindrical and having opposite, open-end portions which are relatively snugly disposed about bushings 100 and 102, respectively.

Clamping means is provided in the form of a pair of ferrules 106 and 108 which may be similar to the ferrules previously described, and which are crimped in operative position about opposite end portions of sleeve 104 for fixing the opposite ends of the sleeve about bushings 100 and 102, respectively.

When it is desired to assemble the weatherproof arrangement shown in FIGURE 9, the components are initially assembled, as shown in FIGURE 4, with ferrule 106, bushing 100 and sleeve 104 disposed about cable 10 to the left of ferrule 82. Ferrule 108 and bushing 102 are initially assembled about cable 12 to the right of ferrule 84. The cable connector is then assembled as previously described, and bushings 100 and 102 then slid into the operative position shown. Sleeve 104 may then be slid over the bushings, and the ferrules 106 and 108 finally slid over the ends of the sleeve and crimped in final clamping relationship. It will be noted that in the finished arrangement, as shown in FIGURE 9, sleeve 104 is substantially centered over the cable connector arrangement previously described and that a small portion of sleeve 104 extends to the left of ferrule 106 and to the right of ferrule 108. It is apparent that in the assembled relationship shown in this figure, a completely weatherproof connector assembly is provided.

It is apparent from the foregoing that there is provided, according to the present invention, a new and novel cable connector incorporating heat sink means which is relatively easy to assemble, and further wherein a weatherproof arrangement may be provided.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:
1. An electrical connection comprising: a first heater cable comprising a central conductor, electrical insulation surrounding said conductor and a braided outer conductor surrounding said electrical insulation, a second heater cable comprising a second central conductor, electrical insulation surrounding said second conductor, and a second braided outer conductor surrounding said electrical insulation, a ferrule crimped to each of said central conductors, a body of ceramic material comprising a heat sink surrounding the ferrule, an outer conductive shell surrounding the body of the ceramic material, and said braided outer conductors being secured to the shell to form a conductive path.

2. The device of claim 1 including a sleeve of moisture-proof material surrounding said connection.

References Cited

UNITED STATES PATENTS

| 288,311 | 11/1883 | Cobb | 174—92 |
| 2,536,003 | 12/1950 | Dupre. | |
| 2,965,699 | 12/1960 | Bollmeier. | |
| 3,146,299 | 8/1964 | Norton | 174—88 |
| 3,317,656 | 5/1967 | Firestone | 174—88 XR |

FOREIGN PATENTS

| 723,457 | 2/1955 | Great Britain. |
| 882,487 | 11/1961 | Great Britain. |

DARRELL L. CLAY, *Primary Examiner.*

U.S. Cl. X.R.

29—628; 339—276; 174—92